United States Patent
Kitamura et al.

(10) Patent No.: US 7,981,529 B2
(45) Date of Patent: Jul. 19, 2011

(54) METHOD OF FORMING METALLIC TONE GLITTER PAINT FILMS AND PAINTED OBJECTS

(75) Inventors: Toshiya Kitamura, Yokohama (JP); Eiji Fujimori, Tokyo (JP)

(73) Assignee: BASF Coatings Japan Ltd., Yokohama-shi (JP)

( * ) Notice: Subject to any disclaimer, the term of this patent is extended or adjusted under 35 U.S.C. 154(b) by 1073 days.

(21) Appl. No.: 11/719,135

(22) PCT Filed: Nov. 24, 2005

(86) PCT No.: PCT/IB2005/003544
§ 371 (c)(1),
(2), (4) Date: May 11, 2007

(87) PCT Pub. No.: WO2006/056870
PCT Pub. Date: Jun. 1, 2006

(65) Prior Publication Data
US 2009/0162696 A1     Jun. 25, 2009

(30) Foreign Application Priority Data
Nov. 29, 2004   (JP) .................................. 2004-343364

(51) Int. Cl.
*B32B 27/00* (2006.01)
*B05D 5/00* (2006.01)
*B05D 1/36* (2006.01)
*B05D 3/02* (2006.01)
*B05D 7/16* (2006.01)

(52) U.S. Cl. .................. 428/699; 427/418.1; 427/419.2; 427/419.3; 427/372.2

(58) Field of Classification Search .................. 427/402, 427/407.1, 409, 419.1, 419.2, 419.3, 372.2, 427/384, 385.5, 388.1; 428/689, 699
See application file for complete search history.

(56) References Cited

U.S. PATENT DOCUMENTS
6,331,326 B1 * 12/2001 Tsunoda et al. .............. 427/202

FOREIGN PATENT DOCUMENTS

| JP | 2160079 A | 6/1990 |
|---|---|---|
| JP | 3270768 A | 12/1991 |
| JP | 6164358 A | 6/1994 |
| JP | 2000084483 A | 3/2000 |
| JP | 2002102798 A | 4/2002 |
| JP | 2002-273329 | 9/2002 |
| JP | 2003-73621 | 3/2003 |
| JP | 2003-88801 | 3/2003 |
| JP | 2003073621 A | 3/2003 |
| JP | 2003-213214 | 7/2003 |
| JP | 2004-358329 | 12/2004 |
| JP | 2005-200519 | 7/2005 |

OTHER PUBLICATIONS

International Search Report for PCT/IB2005/003544, International Filing Date Nov. 24, 2005.
Written Opinion for PCT/IB2005/003544, International Filing Date Nov. 24, 2005.

* cited by examiner

*Primary Examiner* — William Phillip Fletcher, III
(74) *Attorney, Agent, or Firm* — Cantor Colburn LLP

(57) ABSTRACT

A metallic tone glitter paint film is formed by applying sequentially a first base metallic paint, a second base glitter paint in which very small scale-like pigment or very small scale-like pigment and aluminum pigment is compounded and a clear paint, baking and hardening. The metallic paint contains (A) aluminum pigment of average particle diameter $D_{50}$ from 13 to 40 m and average thickness from 0.5 to 2.5 µm (B) aluminum pigment of average particle diameter $D_{50}$ from 13 to 40 µm and average thickness from 0.01 to less than 0.5 m and (C) aluminum pigment of average particle diameter $D_{50}$ from 4 to less than 13 µm and average thickness from 0.01 to 1.3 µm, and the ratio (A/B) by mass of the solid fractions of the aluminum pigments (A) and (B) is from 10/90 to 90/10.

18 Claims, No Drawings

METHOD OF FORMING METALLIC TONE GLITTER PAINT FILMS AND PAINTED OBJECTS

This application is a National Phase Application of Patent Application PCT/IB2005/003544 filed on 24 Nov. 2005, which claims priority to JP 2004-34364, filed 29 Nov. 2004, both of which are hereby incorporated by reference.

FIELD OF THE INVENTION

The invention concerns a method of forming metallic tone glitter paint films which have excellent base-concealing properties and which impart a sense of solid glitter and a sense of glitter which has an ideal high degree of both pearlescent gloss and metallic gloss as industrial paints for use on automobiles, automatic vending machines, domestic electrical goods and other parts for example.

BACKGROUND TECHNOLOGY

Metallic paints which contain aluminum powder and mica powder have been used in the past as glitter paints with which metallic paint films which have the gloss of a metallic tone are formed. For example, metallic paint films comprising a first metallic paint film which contains aluminum powder which is formed on the surface of the object which is being painted, a second metallic paint film which contains petal-like glass powder which has a metallic glitter at the surface which is formed on said first metallic paint film surface and a clear paint film which is formed on said second metallic paint film surface have been proposes (see Patent Citation 1), but there is a weakness in that a pearlescent gloss is not obtained with the petal-like glass which has a metallic gloss which is used hers,
[Patent Citation 1]
Japanese Unexamined Patent Application Laid Open H2-160079
Furthermore, metallic paint film structures in which a clear or colored metallic paint film layer which contains from 0.1 to 30 parts by mass of glitter material and a clear or colored metallic paint film layer which contains from 0.1 to 30 parts by mass of a glitter material which is different in terms of some features among the type, diameter and amount included from the glitter material used in the metallic paint film form a laminate with at least two layers on the surface of a painted object have been proposed (see Patent Citation 2).
[Patent Citation 2]
Japanese Unexamined Patent Application Laid Open H3-270768
However, when the same type of glitter material is used in these metallic paint films there is a problem in that it is difficult to obtain a sense of solid glitter and a sense of glitter with both pearlescent gloss and metallic gloss, and when different glitter materials are used in the metallic paint film layers a solid color which includes glitter material is required as the lowermost layer as well from the two metallic layers in order to obtain a paint film which has a high order of solidity and there is a problem in that it lacks a sense of glitter which has both a pearlescent gloss and a metallic gloss.
Furthermore, a method of forming a multi-layer paint film with a three-coat-one-bake system in which a colored base coat which contains titanium white pigment and aluminum flakes such that the color tone is from N7 to N9 on the Munsell Color Chart is applied, a base coat of a white pearl tone or a silver pearl tone which contains titanium oxide coated scale-like mica powder is applied and then clear painting is carried out and the films are then heated and hardened has been proposed (see Patent Citation 3). However, the pigment color concealing performance on using titanium oxide is high and there is a problem in that the sense of a metallic tone glitter is lacking.
[Patent Citation 3]
Japanese Unexamined Patent Application Laid Open H6-154358
A method of forming multi-layer paint films in which, as a means of obtaining a metallic gloss, a base coat paint (A), a metallic paint (B) and a clear paint (C) are applied sequentially in which a colored pigment is used in the base coat paint (A) and the clarity (brightness) of the paint is set to an L-value of from 0 to 40, in which aluminum petals of thickness from 0.01 to 0.2 μm and aspect ratio from 100 to 300 are used for the metallic pigment in the metallic paint (B) and in which the resin composition compounding rate per 100 parts by weight of the aluminum petals as solid fraction is not more than 400 parts by weight is known (see Patent Citation 4). However, with this method there is a weakness in that glitter which has both a pearlescent gloss sad a metallic gloss is lacking since a metallic paint (B) which has aluminum pigment as the main component has been used.
[Patent Citation 4]
Japanese Unexamined Patent Application laid Open 2000-084483
Moreover, glitter paint compositions which contain a vehicle and two or more types of interference glitter pigment of which one is (a) an interference glitter pigment of average particle diameter from 5 to 10 μm and the other is (b) a different type of glitter material from (a) of average particle diameter from 10 to 30 μm have been proposed (see Patent Citation 5). However, it is not possible even with this method to obtain a sense of glitter which has both a pearlescent gloss and a metallic gloss.
[Patent Citation 5]
Japanese Unexamined Patent Application Laid Open 2003-73621
Furthermore, a method of forming paint films using small particle diameter scale-like glitter material of average particle diameter not more than 10 μm in a first stage in which a glitter base paint film is formed and large particle size scale-like glitter material of average particle diameter at leant 15 μm in a second stage in which a glitter base paint film is formed is known as a method in which the orientation of the large particle glitter material at the paint film surface is even and no deviation arises in the sense of glitter of the paint files which has been formed is known (see Patent Citation 6). However, with this method there is a weakness in that it lacks glitter which has both a pearlescent gloss and a metallic gloss since a metallic paint which has aluminum pigment as the main component has been used.
[Patent Citation 6]
Japanese Unexamined Patent Application Laid Open 2002-102798

DISCLOSURE OF THE INVENTION

Problems to be Resolved by the Invention

The aims of the present invention are to provide paint compositions, a method of forcing paint films and painted objects with which a sense of solid glitter and a sense of glitter with which high degrees of both pearlescent gloss and metallic gloss are combined and with which the base concealing properties are also excellent.

Means of Resolving These Problems

The method for forming a metallic tone glitter paint film of this invention is a method in which a first base metallic paint which contains (A) aluminum pigment of average particle diameter $D_{50}$ from 13 to 40 μm and average thickness from 0.5 to 2.5 μm, (B) aluminum pigment of average particle diameter $D_{50}$ from 13 to 40 μm and average thickness from 0.01 μm but less than 0.5 μm and (C) aluminum pigment of average particle diameter $D_{50}$ from 4 μm but less than 13 μm and average thickness from 0.01 to 1.3 μm in which the ratio (A/B) of the masses of the solid fractions of the aluminum pigments (A) and (B) is from 10/90 to 90/10, the ratio ((A+B)/C) of the total mass of the solid fractions of the aluminum pigments (A) and (B) with respect to the mass of the solid fraction of the aluminum pigment (C) is from 90/10 to 30/70, and the total mass (A+B+C) of the solid fraction of the aluminum pigments (A), (B) and (C) is from 5 to 50 parts by mass per 100 parts by mass of the resin solid fraction, a second base glitter paint in which is compounded a very small scale-like pigment or a very small scale-like pigment and an aluminum pigment (D) and a clear paint are coated sequentially and baked and hardened.

Preferably the total mass of the solid fractions of the very small scale-like pigment and the aluminum pigment in the glitter paint is from 2 to 50 parts by mass per 100 parts by mass of the resin solid fraction.

Furthermore, preferably the abovementioned aluminum pigment comprises one type, or two or more types, selected from among the group comprising the colored aluminum flake pigments, metal oxide coated aluminum flake pigments and vapor deposited aluminum flake pigments.

Furthermore, preferably the very small scale-like glitter material is of one type, or of two or more types, selected from among the group comprising the metal oxide coated mica pigments, metal oxide coated synthetic mica pigments, metal oxide coated alumina flake pigments, metal oxide coated silica flake pigments, metal oxide coated iron oxide, stainless flakes, metallic titanium flake pigments, plate-like molybdenum sulfide, plate-like bismuth chloride, plate-like iron oxide and the cholesteric liquid crystal polymers.

Furthermore, preferably the ratio of aluminum pigment and very small scale-like pigment in the glitter paint is from 0:100 to 50:50 parts by mass. Moreover there are the painted objects which are furnished with a paint film which has been formed with the abovementioned paints.

Effects of the Invention

As a result of thorough research carried oat with a view to resolving the aforementioned problems the inventors have discovered that a sense of solid glitter and a sense of glitter with a high degree of both pearlescent gloss and metallic gloss and excellent concealing properties can be obtained by applying a metallic paint which contains (A) aluminum pigment of average particle diameter $D_{50}$ from 13 to 40 μm and average thickness from 0.5 to 2.5 μm, (B) aluminum pigment of average particle diameter $D_{50}$ from 13 to 40 μm and average thickness from 0.01 μm but less than 0.5 μm and (C) aluminum pigment of average particle diameter $D_{50}$ from 4 μm but less than 13 μm and average thickness from 0.01 to 1.3 μm in which the ratio of the masses of the solid fractions of the aluminum pigments are such that A/B is from 10/90 to 90/10, ((A+B)/C) is from 90/10 to 30/70 and (A+B+C) in parts by weight as solid fraction is from 5 to 50 parts by mass per 100 parts by mass of the resin solid fraction as a first base metallic paint on an undercoat film which has been formed on the surface of the object which is to be painted, applying a glitter paint in which is compounded a very small scale-like pigment or a very small scale-like pigment and an aluminum pigment over this and then applying a clear paint film to form a triple layer paint film and baking and hardening the paint film, and the invention is based upon this discovery.

Embodiment of the Invention

The constitution of the invention is described in detail below.

<The Metallic Paint>

The metallic paint which is the first base of this invention is a paint in which three types of aluminum pigment are compounded and it provides a sense of glitter (sparkle) with a metallic tone and excellent base concealing properties.

<The Glitter Paint>

The glitter paint which is the second base of this invention is a paint in which a very small scale-like pigment, or a very small scale-like pigment and aluminum pigment, is compounded and it provides a pearlescent gloss.

Furthermore, by applying the glitter paint film on the metallic film which is the first base there is provided a color tone which has the sense of glitter (sparkle) of a metallic tone and also pearlescence and depth (a sense of solidity).

The aluminum pigment a (A), (B), (C) and (D) which can be used are aluminum flake pigments, colored aluminum flake pigments, metal oxide covered aluminum flake pigments, vapor deposited aluminum flake pigments and the like. The characteristics of the particles described in this invention can be obtained using the methods of measurement indicated below. Thus the average particle diameter $D_{50}$ indicates the 50% value of the particle size distribution measured with laser diffraction type particle size distribution measuring apparatus. The particle average thickness (μm) is the value obtained with the formula [4000/water surface covering area $(cm^2/g)$], and the method of measurement has been described, for example, on page 1243 of the "Aluminum Handbook" (published by Asakura Shoten for Japanese Light Metals Association Inc, $9^{th}$ edition, published on Apr. 15, 1972).

An aluminum pigment (A) of which the average particle diameter $D_{50}$ is from 13 to 40 μm and the average thickness is from 0.5 to 2.5 μm can impart a sense of glitter and flip-flop properties to the paint film but it is also distinguished by the fact that its concealing properties are poor. Commercial aluminum pigments include Alpaste 56-801, Alpaste TCR-3030 end Alpaste TCR-3040 produced by the Toko Aluminum Co.

The aluminum pigment (A) has an average particle diameter $D_{50}$ of from 13 to 40 μm and an average thickness of from 0.5 to 2.5 μm. If the average particle diameter $D_{50}$ is more than 40 μm and/or the average thickness is more than 2.5 μm then the appearance of the paint film is degraded and this is undesirable. The average particle diameter $D_{50}$ is preferably from 13 to 30 μm and most desirably from 13 to 25 μm. Moreover the average thickness of the pigment particles is preferably from 0.5 to 2.0 μm and most desirably from 0.5 to 1.5 μm.

The aluminum pigment (B) of which the average particle diameter $D_{50}$ is from 13 to 40 μm and the average thickness is from 0.01 but less than 0.5 μm is distinguished by imparting concealing properties to the paint film with no great loss of the sense of glitter and flip-flop properties. Commercial aluminum pigments (B) include Alpaste 61-528 produced by the Toyo Aluminum Co. and SAP 550N produced by the Showa Aluminum Co.

With the aluminum pigment (B) the average particle diameter $D_{50}$ is from 13 to 40 μm and the average thickness is from 0.01 to 0.5 μm. In those cases where the average particle diameter $D_{50}$ exceeds 40 μm and/or the average thickness is less than 0.01 μm it becomes difficult to obtain a stable aluminum pigment and this is undesirable. Moreover, the average particle diameter $D_{50}$ of the pigment (B) is preferably from 13 to 30 μm, and most desirably from 13 to 25 μm. Furthermore the average thickness of the pigment (B) is preferably from 0.01 to 0.45 μm, and most desirably from 0.02 μm to not more than 0.4 μm.

The aluminum pigment (C) of which the average particle diameter $D_{50}$ is from 4 to less than 13 μm and the average thickness is from 0.01 to 1.3 μm can impart concealing properties to the paint film but it is distinguished by the fact that a sense of glitter and flip-flop properties cannot be obtained. Commercial aluminum pigments (C) include Alpaste 6390NS and Alpaste 5680NS produced by the Toyo Aluminum Co.

With the aluminum pigment (C) the average particle diameter $D_{50}$ is from 4 μm to less that 13 μm and the average thickness is from 0.01 to 1.3 μm. In those cases where the average particle diameter $D_{50}$ of pigment (C) is less than 4 μm and/or the average thickness is lees than 0.01 μm the sense of glitter is reduced and this is undesirable. Furthermore, in those cases where the average particle diameter $D_{50}$ of the pigment (C) exceeds 13 μm and the average thickness exceeds 1.3 μm the sense of glitter is reduced and this is undesirable. Moreover, the average particle diameter $D_{50}$ of the pigment (C) is preferably from 5 to 12 μm. Moreover the average thickness of the pigment (C) is preferably from 0.01 to 1.0 μm, and most desirably from 0.01 μm to 0.5 μm.

The mass ratio (A/B) of the aluminum pigment (A) and the aluminum pigment (B) is from 10/90 to 90/10, preferably from 10/90 to 80/20, and most desirably from 10/90 to 70/30.

In those cases where (A/B) is smaller than 10/90 the sense of glitter is lacking and the sense of metallic gloss is lost and it is difficult to obtain paint compositions and paint films which have excellent concealing power and a sense of solid glitter and a sense of glitter which has a high degree of both pearlescent gloss and metallic gloss. In those cases where (A/B) exceeds 90/10 the concealing properties are deficient and the base material is liable to have an effect, stable undercoat concealing properties are lacking and it is difficult to obtain paint compositions and paint films with which a sense of solid glitter and a sense of glitter which has high degrees of both pearlescent gloss and metallic gloss are obtained.

Furthermore, the mass ratio of the mass of aluminum pigments (A) and (B) with respect to the aluminum pigment (C) ((A+B)/C) is from 90/10 to 30/70, preferably from 90/10 to 40/60, and most desirably from 90/10 to 50/50.

In those cases where ((A+B/C) is greater than 90/10 the concealing properties are deficient and the bass material is liable to have an effect, stable undercoat concealing properties are lacking and it is difficult to obtain paint compositions and paint films with a sense of solid glitter and a sense of glitter which has high degrees of both pearlescent gloss and metallic gloss. In those cases where ((A+B)/C) is smaller than 30/70 the sense of glitter is deficient and it is difficult to obtain paint compositions and paint films with a sense of solid glitter and a sense of glitter which has high degrees of both pearlescent gloss and metallic gloss.

Moreover, the total amount of the aluminum pigments (A), (B) and (C) is from 5 to 50 parts by mass, preferably from 5 to 30 parts by mass, and most desirably from 5 to 30 parts by mass, per 100 parts by mass of resin solid fraction. In those cases where the total amount of the aluminum pigments (A), (B) and (C) is less than 5 parts by mass the concealing properties are inadequate and in those cases where it exceeds 50 parts by mass the appearance is downgraded and this is undesirable.

One type, or two or more types, can he used appropriately for each of the abovementioned aluminum pigments (A), (B) and (C).

The aluminum pigments (A), (B), (C) and (D) are pigments which impart concealing properties and the metallic sense of a metallic tone to the paint film, and they leafed, semi-leafed or non-leafed aluminum flakes which have been prepared with the usual methods in which aluminum is subjected to a pulverization treatment together with a fatty acid such as stearic acid in a ball mill. Moreover, colored aluminum flake pigments where an organic colored pigment or an inorganic colored pigment has been coated in the form of petals on the base aluminum flakes can also be used.

Metal oxide coated mica pigments, metal oxide coated synthetic mica pigments, metal oxide coated alumina flake pigments, metal oxide coated silica flake pigments, metal oxide coated plate-like iron oxide, stainless flakes, metallic titanium flake pigments, plate-like molybdenum sulfide, plate-like bismuth chloride, plate-like iron oxide and cholesteric liquid crystal polymers can be used for the aforementioned very small scale-like pigment, and the particle diameter is from 2 to 70 μm, preferably from 4 to 60 μm and most desirably from 5 to 50 μm and the thickness is from 0.1 to 2.5 μm and preferably from 0.2 to 2.0 μm.

The abovementioned metal oxide coated mica pigments and metal oxide coated synthetic mica pigments, metal oxide coated alumina flake pigments, metal oxide coated silica flake pigments and metal oxide coated plate-like iron oxides are materials where a metal oxide such as $TiO_2$, $Fe_2O_3$, $SnO_2$, $ZrO_2$ and the like has been coated onto a natural or synthetic mica powder (mica powder), aluminum oxide powder, silica powder or plate-like iron oxide powder respectively.

The solid fraction mass of the very small scale-like pigment or total solid fraction mass of the very small scale-like pigment and aluminum pigment (D) included in the glitter paint is preferably from 2 to 50 parts by mass, more desirably from 3 to 40 parts by mass, and most desirably from 3 to 30 parts by mass, per 100 parte by mass of the resin solid fraction. In those cases where it is less than 2 parts by mass the manifestation of the glitter of the second coat is liable to he inadequate and in those cases where it exceeds 50 parts by mass the appearance of the paint film is liable to be adversely affected.

The proportions of the aluminum pigment (D) and the very small scale-like pigment are from 0:100 to 50:50 parts by mass, preferably from 0:100 to 40:60 parts by mass, and most desirably from 0:100 to 30:70 parts by mass.

In those cases where the proportion of the aluminum pigment (D) in the proportions of the aluminum pigment (D) and the very small scale-like pigment exceeds 50 parts by mass the concealing power of the aluminum pigment (D) is increased and the solid sense is lost and the sense of glitter with a pearlescent gloss is liable to be reduced.

Colored pigments can be used, as required, in the metallic paint and glitter paint to an extent where the excellent base concealing properties and the sense of solid glitter and the sense of glitter which has high degrees of both pearlescent gloss and metallic gloss which are characteristics of the invention are not lost. Examples of the pigments which can be used include the azo-lake based pigments, phthalocyanine-based pigments, indigo-based pigments, perylene-based pigments, quinophthalone-based pigments, isoindolinone-based pigments, metal complexes, yellow iron oxide, red iron oxide, titanium dioxide, micro titanium oxide, carbon black and the true pigments.

The added amount of colored pigment which is used in the metallic paint is preferably from 0 to 100 parte by mass, more desirably from 0 to 50 parts by mass and most desirably from 0 to 30 parts by mass, per 100 parts by mass of aluminum pigment. In those cases where the amount added exceeds 100 parts by mass the concealing power is increased by the colored pigment and the sense of glitter of the metallic tone becomes inadequate.

The added amount of colored pigment which is used in the glitter paint is preferably from 0 to 50 parts by mass, and most desirably from 0 to 30 parts by mass, per 100 parts by mass of the total solid fraction mass of the very small scale-like pigment and aluminum pigment (D), in those cases where the amount added exceeds 50 parts by mass the concealing power is increased by the colored pigment and the sense of glitter with a pearlescent gloss becomes inadequate.

Crosslinkable functional group containing acrylic resins in which acrylic monomers have been copolymerized with other ethylenic unsaturated monomers, polyester resins where polybasic acids and polyhydric alcohols have been heated and condensed, alkyd resins which have been obtained by modifying polybasic acids and polyhydric alcohols by reacting with modifying agents such as oils and fats and oil and fat fatty acids (soy bean oil, linseed oil, palm oil, stearic acid and the like) or natural resins (rosin, end the like), polyurethane resins and the like can be need for the thermoset resin component which is used in the metallic paint and glitter paint, and from among these the acrylic resins and polyester resins are especially desirable. Combinations of two or more of these resins can also be used. The crosslinking agent can be selected from among the melamine resins, urea resins, isocyanate resins, blocked isocyanate resins, amine-based resins, polyamine-baaed resins and polycarboxylic acid based resins tor example, and combinations of two or more of these can also be used. These thermoset resin components and crosslinking agents are mixed together for use and the hardening reaction can be made to proceed either with heating or at normal temperature.

The proportions of resin for film forming purposes and crosslinking agent of the metallic paint and glitter paint are from 90 to 50 parts by mass of the resin used for film forming purposes calculated as solid fraction and from 10 to 50 parts by mass of crosslinking agent, and preferably from 85 to 60 parts by mass of the resin used for film forming purposes end from 15 to 40 parts by mass of crosslinking agent. If there are less than 10 parte by mass of crosslinking agent (if there are more than 90 parts by mass of resin for film forming purposes) then there is inadequate crosslinking in the paint film. On the other hand if there are more than 50 parts by mass of crosslinking agent (if there are less than 50 parte by mass of resin for film forming purposes) then the storage stability of the composition is reduced and the hardening rate is also increased and so the appearance of the paint film becomes poor.

In addition to the abovementioned components, settling inhibitors, hardening catalysts, ultraviolet absorbers, antioxidants, leveling agents, surface controlling agents, anti-run agents, thickeners, antifoaming agents, lubricants, crosslinked polymer particles (microgels) and the like can be added appropriately to the metallic paint and glitter paint with a view to improving the performance of the paints and the paint films.

The paint compositions which are used in the metallic tone glitter paint film forming method of this invention can be used in a liquid state where they are dissolved or dispersed in an organic solvent, for example in a hydrocarbon such as toluene or xylene, a ketone such as acetone or methyl ethyl ketone, an ester such as ethyl acetate, cellulose acetate or butyl cellosolve, or an alcohol.

The method of forming a paint film of this invention involves forming a metallic paint film on the base material, then forming a glitter paint film and then subsequently forming a topcoat layer using a clear paint.

No limitation is imposed upon the abovementioned base material, and examples include metals such as iron, aluminum, copper and alloys of these metals; inorganic materials such as glass, cement and concrete; plastic materials such as polyethylene resins, polypropylene resins, ethylene/vinyl acetate copolymer resins, polyamide resins, acrylic resins, vinylidene chloride resins, polycarbonate resins, polyurethane resins and epoxy resins and various FRP; and natural or synthetic materials such as wood and fibrous material (such as paper and cloth for example).

In the method of paint film formation of this invention a clear paint is applied after applying a glitter paint via a metallic paint film to the abovementioned base material. In this case chemical forming treatments, undercoat painting and mid-coat painting, for example, may be carried out as required.

In the method of paint film formation of this invention the metallic paint film is formed first of all on the abovementioned base material and then a glitter paint film is formed using a glitter paint. With the abovementioned glitter paint composition the glitter paint film does not conceal the underlying layer completely and forms a composite paint film with the metallic paint film which is present as the under-layer and it provides a color tone which has a sense of glitter (sparkle) with a metallic tone whilst having both a pearlescent gloss and depth (solidity).

The glitter paint can be painted on a metallic paint film which is in the hardened state or it can be painted wet-on-wet on a metallic paint film which is in the unhardened state. The method of painting may be a method such as air-spray painting, airless spray painting, electrostatic painting or the like. Furthermore, no particular limitation is imposed upon the painting film thickness of the glitter paint film as the hardened paint film of the glitter paint film but it is generally applied within the range from 5 to 30 µm. Said paint film can be crosslinked and hardened in the range from normal temperature to 160° C. For hardening at from normal temperature to 100° C. the use of a two-liquid urethane paint is preferred, and for hardening at from 100° C. to 160° C. the use of an acrylic/melamine paint of the one-liquid type, for example, is preferred, but no particular limitation is imposed.

The clear paint is a liquid paint which has been compounded with a known thermoset resin composition.

The main components of the paint composition of the clear paint are a thermoset resin fraction, solvents and additives for use in paints, and materials relating to design such as colored pigments, for example, may be compounded therein, as required, within ranges such that the transparency and appearance of the paint film are not lost.

The materials known in the past can be used for the thermoset resin fraction which is used in the clear paint. For example, there are the resin components comprised of base resins selected from among the acrylic resins, polyester resins, alkyd resins, urethane resins, fluorinated resins and the like which have crosslinkable functional groups and crosslinking agents selected from among the melamina resins, urea resins, isocyanate resins, blocked isocyanate resins and the like. Furthermore, there are also those resins where the crosslinking reaction involves carboxyl groups (including blocked carboxyl groups) and epoxy groups and those where the crosslinking reaction involves the auto-condensation of silanol groups and the crosslinking reaction of silanol groups and hydroxyl groups.

The clear paint may be coated on a glitter paint film which is in the hardened state or it may be painted wet-on-wet on a glitter paint film which is in the unhardened state. The method of painting may be a method such as air-spray painting, airless spray painting, electrostatic painting or the like. Furthermore, although no particular limitation is imposed, the painting film thickness of the clear paint film as the hardened paint film in general is preferably within the range from 15 to 60 µm. Said paint film can be crosslinked and hardened in the range from normal temperature to 160° C. With hardening at from normal temperature to 100° C. the use of a two-liquid urethane paint is preferred, and for hardening at from 100° C. to 160° C. the use of a one-liquid type acrylic/melamine paint is preferred, but no particular limitation is imposed.

The known groups which enable a crosslinking reaction with a crosslinking agent to take place can be used as the crosslinkable functional groups of the thermoset resin components which can he used in the aforementioned metallic paints, glitter paints and clear paints. Examples include epoxy groups, silanol groups, alkoxysilane groups, hydroxyl groups, blocked, carboxyl groups, amino groups, imino groups, isocyanate groups, blocked isocyanate groups, cyclocarbonate groups, vinyl ether groups, vinyl thioether groups, aminomethylol groups, alkylated aminomethylol groups, acetal groups and ketal groups.

The method of applying the aforementioned metallic paint, glitter paint and clear paint, and forming a metallic tone glitter paint film on the object which is to be painted may he a three-coat one-bake method in which the three layers are applied sequentially wet-on-wet and then the three layers are hardened at the same time, a three-coat two-bake method in which the metallic paint is hardened and then the clear paint is applied wet-on-wet on the glitter paint and the three layers are then hardened at the same time, and the three-coat three-bake method in which the metallic paint, the glitter paint and the clear paint each are hardened individually. The crosslinking and hardening can be carried out in the range from room temperature to 160° C. In the range from normal temperature to 100° C. the use of two-liquid urethane paints is preferred and from 100° C. to 160° C., for example, the use of one-liquid type acrylic/melamine paints is preferred, but no particular limitation is imposed.

At least a single layer clear paint film is formed as a topcoat layer on the glitter paint film layer which has been formed in this way. In those cases where a large amount of glitter pigment is present in the abovementioned glitter paint film layer the sense of glitter and sense of solidity of the surface can be improved by applying two or more layers of clear top paint.

Furthermore, these clear paints may be compounded With additives such as colored pigments, true pigments, modifying agents, ultraviolet absorbers, leveling agents, dispersants, antifoaming agents and the like, as required, within ranges where the transparency is not lost.

ILLUSTRATIVE EXAMPLES

The invention is described in more practical terms below by means of examples of production, illustrative examples and comparative examples. In the absence of any indication to the contrary the terms "parts" and "%" signify "parts by mass" and "mass %" respectively. Furthermore, the invention is not limited by these illustrative examples.

Examples of Production 1

(Production of a Resin Solution)

Xylene (300 parts) was introduced into a 2 liter capacity flask which was made of glass and furnished with a thermometer, stirrer, reflux condenser and monomer drip feed apparatus and the temperature was raised slowly to the reflux state. While maintaining the state of reflux, a mixed solution of 75 parts of styrene, 140 parts of methyl methacrylate, 149 parts of butyl methacrylate, 50 parts of butyl acrylate, 75 parts of 2-hydroxyethyl methacrylate, 10 parts of acrylic acid and 1 part of Perbutyl Z (t-butyl peroxybenzoate, polymerization initiator, produced by the Nippon Oil and Fat Co.) was added dropwise from the drip feed apparatus over a period of 3 hours. After the drip feed had been completed the reflux state was maintained for a further 3 hours and then a mixture of 0.5 part of Perbutyl Z and 10 parts of xylene was added dropwise from the drip feed apparatus. Then the reflux temperature was maintained for 2 hours and the reaction was continued, after which 189.5 parts of butyl acetate were added, the mixture was cooled to room temperature and the acrylic resin solution ($\alpha$) of involatile fraction 50% was obtained.

(Production of the Metallic Paints (First Base) (a-1) to (a-13))

A resin comprising the hydroxyl group containing acrylic resin ($\alpha$) obtained in Example of Production 1 and melamine resin, aluminum pigment and colored pigment were compounded in the proportions shown in Tables 1, 2, 3, 4 and 5 to prepare the metallic paints (first bases) (a-1) to (a-13), Moreover, the colored pigments shown in the tables were mill based pigments obtained by sand mill dispersion in the usual way using some of the acrylic resin ($\alpha$) of Example of Production 1.

(Production of the Metallic Paints (First Base) (a-14)

A resin comprising the hydroxyl group containing acrylic resin ($\alpha$) obtained in Example of Production 1 and polyisocyanate resin, aluminum pigment and colored pigment were compounded in the proportions shown in Table 4 (a-14) to prepare a metallic paint (first Base).

(Preparation of the Glitter Paints (Second Base) (b-1) to (b-10) and (b-12) to (b-15)

A resin comprising the hydroxyl group containing acrylic resin ($\alpha$) obtained in Example of Production 1 and melamine resin, vary small scale-like pigment, aluminum pigment and colored pigment were compounded in the proportions shown in Tables 1, 2, 3, 4 and 5 to prepare the glitter paints (b-1) to (b-10) and (b-12) to (b-15). Moreover, the colored pigments shown in the tables were mill based pigments obtained by sand mill dispersion in the usual way using some of the acrylic resin ($\alpha$) of Example of Production 1.

(Preparation of the Glitter Paint (Second Base) (b-11)

A resin comprising the hydroxyl group containing acrylic resin ($\alpha$) obtained in Example of Production 1 and polyisocyanate resin and very small scale-like pigment were compounded in the proportions shown in Table 4 (b-11) to prepare a glitter paint.

The notes indicated in the tables are listed below.

Note 1): Aluminum pigment Alpaste TCR-3040 (trade name), produced by the Toyo Aluminum Co., residue on heating 80%, average particle diameter $D_{50}$ 17 μm, average thickness 0.8 μm.

Note 2): Aluminum pigment Alpaste TCR-3030 (trade name), produced by the Toyo Aluminum Co., residue on heating 70%, average particle diameter $D_{50}$ 21 μm, average thickness 1.0 μm.

Note 3): Aluminum pigment Alpaste 56-501 (trade name), produced by the Toyo Aluminum Co., residue on heating 75%, average particle diameter $D_{50}$ 28 μm, average thickness 1.0 μm.

Note 4): Aluminum pigment SAP 550N (trade name), produced by the Showa Aluminum Powder Co., residue on heating 65%, average particle diameter $D_{50}$ 21.1 μm, average thickness 0.24 μm.

Note 5): Aluminum pigment Alpaste 6390NS (trade name), produced by the Toyo Aluminum Co., residue on heating 67%, average particle diameter $D_{50}$ 8 μm, average thickness 0.18 μm.

Note 6): Trade name, titanium oxide, inorganic pigment, produced by the Ishihara Sangyo Co.

Note 7): Trade name, blue colored pigment, organic Pigment, produced by the BASF Co.

Note 8): Trade name, red colored pigment, organic pigment, produced by the BASF Co.

Note 9): Trade name, mixed alkylated melamine resin, produced by the Mitsui Scitech Co., involatile fraction 100%.

Note 10): Trade name, polyisocyanate resin, produced by the Sumitomo Bayer Urethane Co., involatile fraction 75%, isocyanate content 16.5%.

Note 11): Metal, oxide coated silica flake pigment Glastream T20-01 WNT Biolavandage (trade name), produced by the Merck Co., involatile fraction 100%.

Note 12): Metal oxide coated alumina flake pigment Silaric T60-23 WNT Crystal Blue (trade name), produced by the Merck Co., blue color, involatile fraction 100%.

Note 13): Metal oxide coated alumina flake pigment Silaric T60-21 WNT Solaris Red (trade name), produced by the Merck Co., red color, involatile fraction 100%.

Note 14): Metal oxide coated mica pigment Rutile Iriozin 219 WNT Rutile Lilac Pearl (trade name), produced by the Merck Co., involatile fraction 100%.

Note 15): Metal oxide coated alumina flake pigment Silaric T60-10 WNT Crystal Silver (trade name), produced by the Merck Co., silver color, involatile fraction 100%.

(Preparation of Sheets for Appearance Evaluation Purposes)

Hiepico No. 500 Sealer White (trade name, produced by the Nippon Oil and Fat/BASF Coatings Co.) was painted with an air sprayer on a tin plated sheet to provide a film thickness after hardening of 30 μm and, after setting for 5 minutes, this was hardened by baking at 140° C. for 20 minutes to prepare a mid-coat painted sheet.

Example 1

The metallic paint (first base) (a-1) shown in Table 1 (100 parts) diluted with thinner comprising 50 parts toluene and 50 parts butyl acetate was painted with an air sprayer onto the abovementioned mid-coat painted sheet to form a metallic paint (first base) paint film. After being left to stand for 2 minutes at 25° C., 100 parts of the glitter paint (second base) (b-1) shown in Table 1 diluted with thinner comprising 50 parts toluene and 50 parts butyl acetate was painted on said metallic paint (first base) paint film with an air sprayer to form a glitter paint (second base) paint film. After being left to stand for 3 minutes at 25° C. a clear-coat paint (trade name Belcoat No. 6200 Clear, produced by the Nippon Oil and Fat/BASF Coatings Co.) was painted with an air sprayer over said glitter paint (second base) paint film. After being left to stand for 5 minutes at 25° C. said multi-layer paint film was baked for 20 minutes at 140° C. and hardened to produce a painted sheet. The film thicknesses after hardening said multi-layer paint film were metallic paint (first base) paint film 10 μm, glitter paint (second base) paint film 10 μm and clear paint paint film 30 μm.

Examples 2 to 13

The painted sheets of Examples 2 to 13 shown in Tables 1, 2, 3 and 4 were prepared in the same way as in Example 1.

Example 14

The metallic paint (first base) (a-14) shown in Table 4 (100 parts) diluted with thinner comprising 50 parts toluene and 50 parts butyl acetate was painted with an air sprayer onto a mid-coat painted sheet prepared beforehand to form a metallic paint (first base) paint film. Said metallic paint (first base) was a two-liquid urethane paint in which Sumidure N-75 (trade name, produced by the Sumitomo Bayer Urethane Co., solid fraction 75%, isocyanate content 16.5%) was used as a urethane hardening agent. After being left to stand for 2 minutes at 25° C. (normal temperature), 100 parts of the glitter paint (second base) (b-11) shown in Table 4 diluted with thinner comprising 50 parts toluene and 50 parts butyl acetate was painted on said metallic paint (first base) painted surface with an air sprayer to form a glitter paint (second base) paint film. Said glitter paint was a two-liquid urethane paint in which Sumidure N-75 (trade name, produced by the Sumitomo Bayer Urethane Co., solid fraction 75%, isocyanate content 16.5%) was used as a urethane hardening agent. After being left to stand for 3 minutes at 25° C. a clear-coat paint (trade name Hiurethane No. 6500 Clear, a two-liquid type polyurethane paint, produced by the Nippon Oil and Fat/BASF Coatings Co.) was painted with an air sprayer over said glitter paint (second base) painted surface. This was left to stand for 3 days at 25° C. The film thicknesses after hardening said multi-layer paint film were metallic paint (first base) paint film 10 μm, glitter paint (second base) paint film 10 μm and clear paint paint film 30 μm.

Comparative Examples 1 to 4

The painted sheets of Comparative Examples 1 to 4 shown in Table 5 were prepared in the same way as in Example 1.

The painted sheets of Examples 1 to 14 and Comparative Examples 1 to 4 were evaluated in respect of various properties on the basis of the criteria indicated below.

(Base Concealment)

⊚: The base was completely concealed.

○: The base was concealed with no problem in practical terms.

Δ: The base could be discerned.

X: The bass was completely uncovered.

(Metallic Sense of the First Base)

⊚: A satisfactory metallic sense.

○: A metallic sense presenting no problem in practice.
Δ: A weak metallic sense.
X: No metallic sense.
(Glitter Sense of Glitter of Second Base)
◉: A satisfactory sense of glitter.
○: A sense of glitter presenting no problem in practice.
Δ: A weak sense of glitter.
X: No sense of glitter.
(Appearance of the Paint Film)
◉: No problem.
○: Slight absorption or unevenness but no problem in practice.
Δ: Some absorption or unevenness.
X: Distinct absorption or unevenness.
(Sense of Solid Glitter and Sense of Glitter with Combined Pearlesent Gloss and Metallic Gloss)
◉: A satisfactory effect was produced.
○: An effect providing no problem in practice was produced.
Δ: The effect was unsatisfactory
X: No effect was produced.

The painted sheets of Examples 1 to 14 and Comparative Examples 1 to 4 were evaluated on the basis of the criteria indicated above and the results are shown in Tables 1 to 5.

TABLE 1

| | Example | 1 | 2 | 3 | 4 |
|---|---|---|---|---|---|
| Metallic Paint First Base | Compound No. | a-1 | a-2 | a-3 | a-4 |
| | A/B | 25 | 25 | 30 | 75 |
| | (A + B)/C | 50 | 70 | 55 | 55 |
| | (A + B + C)/Resin Solid Fraction | 25 | 25 | 25 | 25 |
| | Colored Pigment/(A + B + C) | 0 | 0 | 0 | 0 |
| | Aluminum Pigment A1 (Note 1) | 2.05 | 1.53 | 2.41 | 2.30 |
| | Aluminum Pigment B (Note 4) | 7.32 | 5.65 | 2.96 | 0.34 |
| | Aluminum Pigment C (Note 5) | 2.03 | 3.23 | 4.70 | 6.79 |
| | Acrylic Resin Solution (α) | 42.0 | 42.0 | 42.0 | 42.5 |
| | Simel 212 (Note 9) | 7.00 | 7.00 | 7.00 | 7.00 |
| | Xylane | 10.00 | 10.00 | 10.00 | 10.00 |
| | Butyl Acetate | 30.52 | 30.58 | 30.93 | 30.97 |
| Glitter Paint Second Base | Compound No. | b-1 | b-2 | b-3 | b-4 |
| | Pearl pigment (%) | 100 | 100 | 95 | 82 |
| | Aluminum Pigment D % | 0 | 0 | 5 | 18 |
| | Colored Pigment per 100 of Glitter pigment | 0 | 10 | 0 | 0 |
| | Glitter Pigment per 100 of Resin Solid Fraction | 6 | 20 | 28 | 20 |
| | Very Small Scale-like Pigment 1 (Note 11) | 2.72 | | | |
| | Very Small Scale-like Pigment 2 (Note 12) | | 4.20 | | |
| | Very Small Scale-like Pigment 3 (Note 13) | | | 4.15 | |
| | Very Small Scale-like Pigment 4 (Note 14) | | | | 2.88 |
| | Alpaste TCR-3040 (Note 1) | | | 0.28 | 0.83 |
| | Tibake CR90 (Note 6) | | 0.05 | | |
| | Heliogen Blue L6700F (Note 7) | | 0.36 | | |
| | Acrylic Resin Solution (α) | 72.45 | 32.75 | 25.00 | 58.28 |
| | Simel 212 (Note 9) | 0.95 | 4.10 | 3.23 | 7.27 |
| | Xylane | 10.00 | 10.00 | 10.00 | 10.00 |
| | Butyl Acetate | 5.77 | 48.52 | 57.44 | 20.73 |
| Clear Paint | Belcoat No. 6200 Clear | Used | Used | Used | Used |
| Paint Film Thicknesses μm | Metallic First Base Paint Film | 10 | 10 | 10 | 10 |
| | Glitter Second Base Paint Film | 10 | 8 | 8 | 8 |
| | Clear Coat paint film | 30 | 30 | 30 | 30 |
| Visual Observation | Concealment of Base | ◉ | ◉ | ◉ | ◉ |
| | First Base | ◉ | ◉ | ◉ | ○ |
| | Second Base, sense of glitter or glitter film | ◉ | ◉ | ◉ | ◉ |
| | Paint Film Appearance | ◉ | ◉ | ◉ | ◉ |
| | Sense of Solid Glitter and Sense of Glitter with both pearlescent gloss and metallic gloss | ◉ | ◉ | ◉ | ◉ |

TABLE 2

| | Example | 5 | 6 | 7 | 8 |
|---|---|---|---|---|---|
| Metallic Paint First Base | Compound No. | a-5 | a-6 | a-7 | a-8 |
| | A/B | 85 | 25 | 30 | 75 |
| | (A + B)/C | 45 | 70 | 70 | 70 |
| | (A + B + C)/Resin Solid Fraction | 25 | 10 | 35 | 45 |
| | Colored Pigment/(A + B + C) | 0 | 0 | 0 | 0 |
| | Aluminum Pigment A1 (Note 1) | 3.35 | 0.79 | 1.98 | 2.38 |
| | Aluminum Pigment B (Note 4) | 0.73 | 2.57 | 7.33 | 8.77 |
| | Aluminum Pigment C (Note 5) | 5.75 | 1.72 | 4.06 | 4.86 |

TABLE 2-continued

|  | Example | 5 | 6 | 7 | 8 |
|---|---|---|---|---|---|
| | Acrylic Resin Solution (α) | 42.00 | 47.73 | 38.39 | 35.21 |
| | Simel 212 (Note 9) | 7.00 | 7.98 | 6.48 | 6.02 |
| | Xylane | 10.00 | 10.00 | 10.00 | 10.00 |
| | Butyl Acetate | 31.28 | 39.53 | 31.25 | 32.75 |
| Glitter Paint Second Base | Compound No. | b-5 | b-6 | b-7 | b-8 |
| | Pearl pigment (%) | 65 | 88 | 52 | 55 |
| | Aluminum Pigment D % | 35 | 12 | 8 | 45 |
| | Colored Pigment per 100 of Glitter pigment | 0 | 0 | 5 | 0 |
| | Glitter Pigment per 100 of Resin Solid Fraction | 12 | 35 | 45 | 3 |
| | Very Small Scale-like Pigment 1 (Note 11) |  |  | 2.59 |  |
| | Very Small Scale-like Pigment 2 (Note 12) | 1.39 |  |  | 0.91 |
| | Very Small Scale-like Pigment 3 (Note 13) |  | 3.59 |  |  |
| | Very Small Scale-like Pigment 4 (Note 14) |  |  | 1.00 |  |
| | Very Small Scale-like Pigment 5 (Note 15) |  | 1.05 |  | 2.22 |
| | Alpaste TCR-3040 (Note 1) | 0.35 | 0.78 | 0.46 | 0.98 |
| | Tibake CR90 (Note 6) |  |  | 0.52 |  |
| | Heriogen Red L3800RD (Note 8) |  |  | 0.22 |  |
| | Acrylic Resin Solution (α) | 28.57 | 23.70 | 26.30 | 29.35 |
| | Simel 212 (Note 9) | 3.57 | 2.96 | 2.04 | 3.67 |
| | Xylane | 10.00 | 10.00 | 10.00 | 10.00 |
| | Butyl Acetate | 55.52 | 57.99 | 66.76 | 55.22 |
| Clear Paint | Belcoat No. 6200 Clear | Used | Used | Used | Used |
| Paint Film Thicknesses μm | Metallic First Base Paint Film | 10 | 10 | 10 | 10 |
| | Glitter Second Base Paint Film | 6 | 5 | 6 | 9 |
| | Clear Coat paint film | 30 | 35 | 30 | 30 |
| Visual Observation | Concealment of Base | ⊚ | ○ | ⊚ | ⊚ |
| | First Base, metal of metallic base film | ○ | ⊚ | ⊚ | ⊚ |
| | Second Base, sense of glitter or glitter film | ⊚ | ⊚ | ⊚ | ⊚ |
| | Paint Film Appearance | ○ | ⊚ | ○ | ○ |
| | Sense of Solid Glitter and Sense of Glitter with both pearlescent gloss and metallic gloss | ⊚ | ⊚ | ⊚ | ⊚ |

TABLE 3

|  | Example | 9 | 10 | 11 | 12 |
|---|---|---|---|---|---|
| Metallic Paint First Base | Compound No. | a-9 | a-10 | a-11 | a-12 |
| | A/B | 25 | 25 | 25 | 25 |
| | (A + B)/C | 70 | 70 | 70 | 70 |
| | (A + B + C)/Resin Solid Fraction | 25 | 25 | 25 | 25 |
| | Colored Pigment/(A + B + C) | 0 | 0 | 5 | 35 |
| | Aluminum Pigment A1 (Note 1) |  |  | 2.45 | 1.23 |
| | Aluminum Pigment A2 (Note 2) | 2.75 |  |  |  |
| | Aluminum Pigment A3 (Note 3) |  | 1.63 |  |  |
| | Aluminum Pigment B (Note 4) | 5.65 | 5.65 | 5.38 | 4.18 |
| | Aluminum Pigment C (Note 5) | 3.23 | 3.23 | 2.99 | 2.22 |
| | Tibake CR90 (Note 6) |  |  | 0.33 |  |
| | Heliogen Blue L6700F (Note 7) |  |  |  | 1.81 |
| | Acrylic Resin Solution (α) | 42.00 | 42.00 | 42.00 | 42.00 |
| | Simel 212 (Note 9) | 7.00 | 7.00 | 7.00 | 7.00 |
| | Xylane | 10.00 | 10.00 | 10.00 | 10.00 |
| | Butyl Acetate | 30.45 | 30.58 | 30.84 | 32.54 |
| Glitter Paint Second Base | Compound No. | b-6 | b-7 | b-8 | b-9 |
| | Pearl pigment (%) | 100 | 100 | 92 | 100 |
| | Aluminum Pigment D % | 0 | 0 | 0 | 0 |
| | Colored Pigment per 100 of Glitter pigment | 0 | 0 | 5 | 15 |
| | Glitter Pigment per 100 of Resin Solid Fraction | 5 | 5 | 45 | 25 |
| | Very Small Scale-like Pigment 1 (Note 11) | 2.72 | 2.72 | 2.00 |  |
| | Very Small Scale-like Pigment 2 (Note 12) |  |  |  | 3.00 |

TABLE 3-continued

|  |  | Example | 9 | 10 | 11 | 12 |
|---|---|---|---|---|---|---|
|  |  | Very Small Scale-like Pigment 4 (Note 14) |  |  | 1.00 |  |
|  |  | Very Small Scale-like Pigment 5 (Note 15) |  | 1.22 | 1.88 |  |
|  |  | Alpaste TCR-3040 (Note 1) |  |  | 0.46 |  |
|  |  | Tibake CR-90 (Note 6) |  |  | 0.02 |  |
|  |  | Heliogen Blue L6700F (Note 7) |  |  |  | 0.55 |
|  |  | Heriogen Red L3800RD (Note 8) |  |  | 0.21 |  |
|  |  | Acrylic Resin Solution (α) | 72.45 | 72.45 | 16.30 | 24.88 |
|  |  | Simel 212 (Note 9) | 9.06 | 8.05 | 2.04 | 3.22 |
|  |  | Xylane | 10.00 | 10.00 | 10.00 | 10.00 |
|  |  | Butyl Acetate | 5.77 | 5.77 | 66.75 | 57.57 |
| Clear Paint |  | Belcoat No. 6200 Clear | Used | Used | Used | Used |
| Paint Film Thicknesses μm |  | Metallic First Base Paint Film | 9 | 7 | 10 | 11 |
|  |  | Glitter Second Base Paint Film | 10 | 10 | 10 | 10 |
|  |  | Clear Coat paint film | 30 | 30 | 30 | 30 |
| Visual Observation |  | Concealment of Base | ◎ | ◎ | ◎ | ◎ |
|  |  | First Base, metal of metallic paint film | ◎ | ◎ | ◎ | ○ |
|  |  | Second Base, sense of glitter or glitter film | ◎ | ◎ | ◎ | ◎ |
|  |  | Paint Film Appearance | ◎ | ◎ | ○ | ◎ |
|  |  | Sense of Solid Glitter and Sense of Glitter with both pearlescent gloss and metallic gloss | ◎ | ◎ | ◎ | ◎ |

TABLE 4

|  |  | Example | 13 | 14 |
|---|---|---|---|---|
| Metallic Paint First Base | | Compound No. | a-13 | a-14 |
| | | A/B | 25 | 25 |
| | | (A + B)/C | 70 | 70 |
| | | (A + B + C)/Resin Solid Fraction | 25 | 25 |
| | | Colored Pigment/(A + B + C) | 45 | 0 |
| | | Aluminum Pigment A1 (Note 1) | 1.06 | 1.76 |
| | | Aluminum Pigment B (Note 4) | 3.90 | 5.42 |
| | | Aluminum Pigment C (Note 5) | 2.16 | 3.55 |
| | | Heliogen Red L3880RD (Note 8) | 3.17 |  |
| | | Acrylic Resin Solutioin (α) | 42.09 | 45.92 |
| | | Simel 212 (Note 9) | 7.00 |  |
| | | Sumidure N-75 (Note 10) |  | 6.72 |
| | | Xylane | 10.00 | 10.00 |
| | | Butyl Acetate | 32.72 | 25.63 |
| Glitter Paint Second Base | | Compound No. | b-10 | b-11 |
| | | Pearl pigment (%) | 100 | 100 |
| | | Aluminum Pigment D % | 0 | 0 |
| | | Colored Pigment per 100 of Glitter pigment | 32 | 0 |
| | | Glitter Pigment per 100 of Resin Solid Fraction | 10 | 8 |
| | | Very Small Scale-like Pigment 1 (Note 11) |  | 2.72 |
| | | Very Small Scale-like Pigment 3 (Note 13) | 2.65 |  |
| | | Tibake Cr-90 (Note 6) | 0.01 |  |
| | | Heliogen Blue L6700F (Note 7) | 0.02 |  |
| | | Heriogen Red L3880RD (Note 8) | 0.52 |  |
| | | Acrylic Resin Solutioin (α) | 42.46 | 39.37 |
| | | Simel 212 (Note 9) | 5.30 |  |
| | | Sumidure N-75 (Note 10) |  | 8.73 |
| | | Xylane | 10.00 | 10.00 |
| | | Butyl Acetate | 35.80 | 39.25 |
| Clear Paint | | Belcoat No. 6200 Clear | Used |  |
| | | Sinrethane No 6500 Clear |  | Used |
| Paint Film Thicknesses μm | | Metallic First Base Paint Film | 14 | 10 |
| | | Glitter Second Base Paint Film | 10 | 10 |
| | | Clear Coat paint film | 30 | 30 |
| Visual Observation | | Concealment of Base | ◎ | ◎ |
| | | First Base, metal of metallic film | ○ | ◎ |
| | | Second Base, sense of glitter or glitter film | ○ | ◎ |
| | | Paint Film Appearance | ◎ | ◎ |
| | | Sense of Solid Glitter and Sense of Glitter with both pearlescent gloss and metallic gloss | ◎ | ◎ |

TABLE 5

|  |  | Comparative Example | 1 | 2 | 3 | 4 |
|---|---|---|---|---|---|---|
| Metallic Paint First Base | | Compound No. | a-9 | a-10 | a-11 | a-12 |
| | | A/B | 5 | 35 | 35 | 25 |
| | | (A + B)/C | 95 | 20 | 70 | 70 |
| | | (A + B + C)/Resin Solid Fraction | 7 | 7 | 3 | 50 |
| | | Colored Pigment/(A + B + C) | 0 | 0 | 0 | 0 |
| | | Aluminum Pigment A1 (Note 1) | 0.12 | 0.47 | 0.18 | 3.67 |
| | | Aluminum Pigment B (Note 4) | 2.72 | 2.03 | 0.63 | 23.57 |
| | | Aluminum Pigment C (Note 5) | 0.25 | 2.34 | 0.38 | 7.52 |
| | | Acrylic Resin Solution (α) | 45.07 | 49.07 | 56.97 | 32.82 |
| | | Simel 212 (Note 9) | 3.13 | 3.28 | 3.50 | 3.47 |
| | | Xylane | 10.00 | 10.00 | 10.00 | 10.00 |
| | | Butyl Acetate | 25.77 | 29.92 | 28.30 | 26.55 |

TABLE 5-continued

| | Comparative Example | 1 | 2 | 3 | 4 |
|---|---|---|---|---|---|
| Glitter Paint Second Base | Compound No. | b-12 | b-13 | b-14 | b-15 |
| | Pearl pigment (%) | 100 | 33 | 45 | 43 |
| | Aluminum Pigment D % | 0 | 7 | 55 | 57 |
| | Colored Pigment per 100 of Glitter pigment | 0 | 0 | 0 | 0 |
| | Glitter Pigment per 100 of Resin Solid Fraction | 1 | 55 | 58 | 15 |
| | Very Small Scale-like Pigment 1 (Note 11) | 0.48 | | | |
| | Very Small Scale-like Pigment 2 (Note 12) | | 3.96 | | |
| | Very Small Scale-like Pigment 3 (Note 13) | | | 2.45 | |
| | Very Small Scale-like Pigment 4 (Note 14) | | | | 1.96 |
| | Alpaste TCR-3040 (Note 1) | | 0.37 | 3.83 | 3.29 |
| | Acrylic Resin Solution (α) | 75.04 | 12.35 | 13.38 | 48.70 |
| | Simel 212 (Note 9) | 3.50 | 2.55 | 1.90 | 6.08 |
| | Xylane | 10.00 | 10.00 | 10.00 | 10.00 |
| | Butyl Acetate | 3.28 | 72.73 | 55.60 | 25.99 |
| Clear Paint | Belcoat No. 6200 Clear | Used | Used | Used | Used |
| Paint Film Thicknesses | Metallic First Base Paint Film | 10 | 10 | 10 | 10 |
| | Glitter Second Base Paint Film | 10 | 8 | 8 | 8 |
| | Clear Coat paint film | 30 | 36 | 30 | 30 |
| Visual Observation | Concealment of Base | Δ | ○ | X | ⊚ |
| | First Base, metal of metallic paint film | Δ | Δ | X | Δ |
| | Second Base, sense of glitter or glitter film | X | ⊚ | ⊚ | ○ |
| | Paint Film Appearance | ⊚ | ⊚ | ⊚ | Δ |
| | Sense of Solid Glitter and Sense of Glitter with both pearlescent gloss and metallic gloss | X | Δ | Δ | Δ |

In Examples 1 to 14 the requirements of the present invention were satisfied and metallic tone glitter paint films which had excellent base concealing power and paint film appearance and which had both pearlescent gloss and metallic gloss could be obtained.

However, as shown is Comparative Example 1 in Table 5, when the ratio A/B in the metallic paint is low and (A+B)/C is large and the proportion of pigment with respect to the resin solid fraction in the glitter paint (second base) is small, the concealment of the base, the metallic sense of the metallic paint film and the sense of glitter of the glitter paint film are poor and moreover, a metallic tone glitter paint film which has both a pearlescent gloss and a metallic gloss is not obtained. As shown by Comparative Example 2 in Table 5, when the ratio A/B in the metallic paint is large and (A+B)/C is small and the proportion of glitter pigment with respect to the resin solid fraction in the glitter paint is large, the metallic sense of the metallic paint film is poor and a metallic tone glitter paint film which has both a pearlescent gloss and a metallic gloss is not obtained.

As shown by Comparative Example 3 in Table 5, when the amount of aluminum pigment (A+B+C) compounded is small the concealment of the base and the metallic sense of the metallic paint film are poor and, moreover, a metallic tone glitter paint film which has both a pearlescent gloss and a metallic gloss is not obtained.

As shown by Comparative Example 4 in Table 5, if the proportion of aluminum pigment (A+B+C) with respect to the resin solid fraction of the metallic paint (first base) is large then the paint film appearance and the metallic sense of the metallic paint film are poor and a metallic tone glitter paint film which has both a pearlescent gloss and a metallic gloss is not obtained.

The invention claimed is:

1. A method of forming a metallic tone glitter paint film comprising:
   applying a first base metallic paint for providing a sense of glitter with a metallic tone to an object to be painted, the first base metallic paint comprising:
      an aluminum pigment (A) of average particle diameter $D_{50}$ from 13 to 40 μm and average thickness from 0.5 to 2.5 μm;
      an aluminum pigment (B) of average particle diameter $D_{50}$ from 13 to 40 μm and average thickness from 0.01 μm but less than 0.5; and
      an aluminum pigment (C) of average particle diameter $D_{50}$ from 4 μm but less than 13 μm and average thickness from 0.01 to 1.3 μm wherein the ratio (A/B) of the masses of the solid fractions of the aluminum pigments (A) and (B) is from 10/90 to 90/10, the ratio ((A+B)/C) of the total mass of the solid fractions of the aluminum pigments (A) and (B) with respect to the mass of the solid fraction of the aluminum pigment (C) is from 90/10 to 30/70, and the total mass (A+B+C) of the solid fraction of the aluminum pigments (A), (B) and (C) is from 5 to 50 parts by mass per 100 parts by mass of the resin solid fraction;
   applying a second base glitter paint to the first base metallic paint wet-on-wet, wherein the first base metallic paint is in an unhardened state, the second base glitter paint comprising a very small scale-like pigment or a very small scale-like pigment, and an aluminum pigment (D), wherein the very small scale-like pigment is characterized by providing the metallic tone glitter paint film with a pearlescent gloss;
   applying a clear paint to the second base glitter paint wet-on-wet, wherein the second base glitter paint is in an unhardened state; and baking the first base metallic paint, the second base glitter paint, and the clear paint simultaneously at a temperature ranging from room temperature to 160° C., wherein the resulting metallic tone glitter paint film obtains both a pearlescent gloss and a metallic gloss.

2. The method of claim 1 wherein the mass of solid fraction of the very small scale-like pigment in the glitter paint is from 2 to 50 parts by mass per 100 parts by mass of resin solid fraction.

3. The method of claim 1 wherein at least one of the aluminum pigments (A), (B), (C) and (D) is selected from the group consisting of aluminum flake pigments, colored aluminum flake pigments, metal oxide coated aluminum flake pigments, vapor deposited aluminum flake pigments, and combinations comprising at least one of the foregoing.

4. The method of claim 1 wherein the very small scale-like pigment is selected from the group consisting of metal oxide coated mica pigments, metal oxide coated synthetic mica pigments, metal oxide coated alumina flake pigments, metal oxide coated silica flake pigments, metal oxide coated iron oxides, stainless flakes, metallic titanium flake pigments, plate-like molybdenum sulfide, plate-like bismuth chloride, plate-like iron oxide, cholesteric liquid crystal polymers, and combinations comprising at least one of the foregoing.

5. The method of claim 1 wherein the ratio by mass of aluminum pigment (D) and the very small scale-like pigment in the glitter paint is from 0:100 to 50:50 parts by mass.

6. A painted object which is furnished with a paint film which has been formed with the method of claim 1.

7. A method of forming a metallic tone glitter paint film comprising:
  applying a first base metallic paint for providing a sense of glitter with a metallic tone to an object to be painted, wherein the first base metallic paint comprises:
    an aluminum pigment (A) of average particle diameter $D_{50}$ from 13 to 40 μm and average thickness from 0.5 to 2.5 μm;
    an aluminum pigment (B) of average particle diameter $D_{50}$ from 13 to 40 μm and average thickness from 0.01 μm but less than 0.5; and
    an aluminum pigment (C) of average particle diameter $D_{50}$ from 4 μm but less than 13 μm and average thickness from 0.01 to 1.3 μm and further wherein the ratio (A/B) of the masses of the solid fractions of the aluminum pigments (A) and (B) is from 10/90 to 90/10, the ratio ((A+B)/C) of the total mass of the solid fractions of the aluminum pigments (A) and (B) with respect to the mass of the solid fraction of the aluminum pigment (C) is from 90/10 to 30/70, and the total mass (A+B+C) of the solid fraction of the aluminum pigments (A), (B) and (C) is from 5 to 50 parts by mass per 100 parts by mass of the resin solid fraction;
  baking the first base metallic paint at a temperature ranging from room temperature to 160° C.;
  applying a second base glitter paint to the first base metallic paint, wherein the first base metallic paint is in a hardened state, and wherein the second base glitter paint comprises a very small scale-like pigment or a very small scale-like pigment and an aluminum pigment (D), wherein the very small scale-like pigment is characterized by providing the metallic tone glitter paint film with a pearlescent gloss and wherein the very small scale-like pigment is selected from the group consisting of metal oxide coated mica pigments, metal oxide coated synthetic mica pigments, metal oxide coated alumina flake pigments, metal oxide coated silica flake pigments, metal oxide coated iron oxides, stainless flakes, metallic titanium flake pigments, plate-like molybdenum sulfide, plate-like bismuth chloride, plate-like iron oxide, cholesteric liquid crystal polymers, and combinations comprising at least one of the foregoing;
  applying a clear paint to the second base glitter paint wet-on-wet, wherein the second base glitter paint is in an unhardened state; and
  baking the first base metallic paint, the second base glitter paint, and the clear paint simultaneously at a temperature ranging from room temperature to 160° C., wherein the resulting metallic tone glitter paint film obtains both a pearlescent gloss and a metallic gloss.

8. The method of claim 7 wherein the mass of solid fraction of the very small scale-like pigment in the glitter paint is from 2 to 50 parts by mass per 100 parts by mass of resin solid fraction.

9. The method of claim 7 wherein at least one of the aluminum pigments (A), (B), (C) and (D) is selected from the group consisting of aluminum flake pigments, colored aluminum flake pigments, metal oxide coated aluminum flake pigments, vapor deposited aluminum flake pigments, and combinations thereof.

10. The method of claim 7 wherein the ratio by mass of aluminum pigment (D) and the very small scale-like pigment in the glitter paint is from 0:100 to 50:50 parts by mass.

11. A painted object which is furnished with a paint film which has been formed with the method of claim 7.

12. (Presently Presented) A method of forming a metallic tone glitter paint film comprising:
  applying a first base metallic paint for providing a sense of glitter with a metallic tone to an object to be painted, wherein the first base metallic paint comprises:
    an aluminum pigment (A) of average particle diameter $D_{50}$ from 13 to 40 μm and average thickness from 0.5 to 2.5 μm;
    an aluminum pigment (B) of average particle diameter $D_{50}$ from 13 to 40 μm and average thickness from 0.01 μm but less than 0.5; and
    an aluminum pigment (C) of average particle diameter $D_{50}$ from 4 μm but less than 13 μm and average thickness from 0.01 to 1.3 μm and further wherein the ratio (A/B) of the masses of the solid fractions of the aluminum pigments (A) and (B) is from 10/90 to 90/10, the ratio ((A+B)/C) of the total mass of the solid fractions of the aluminum pigments (A) and (B) with respect to the mass of the solid fraction of the aluminum pigment (C) is from 90/10 to 30/70, and the total mass (A+B+C) of the solid fraction of the aluminum pigments (A), (B) and (C) is from 5 to 50 parts by mass per 100 parts by mass of the resin solid fraction;
  baking the first base metallic paint at a temperature ranging from room temperature to 160° C.;
  applying a second base glitter paint to the first base metallic paint, wherein the first base metallic paint is in a hardened state, and wherein the second base glitter paint comprises a very small scale-like pigment or a very small scale-like pigment and an aluminum pigment (D), wherein the very small scale-like pigment provides the metallic tone glitter paint film with a pearlescent gloss, wherein the very small scale-like pigment has a particle diameter of 2 to 70 μm and a thickness of from 0.1 to 2.5 μm, and wherein the very small scale-like pigment is selected from the group consisting of metal oxide coated mica pigments, metal oxide coated synthetic mica pigments, metal oxide coated alumina flake pigments, metal oxide coated silica flake pigments, metal oxide coated iron oxides, stainless flakes, metallic titanium flake pigments, plate-like molybdenum sulfide, plate-like bismuth chloride, plate-like iron oxide, cholesteric liquid crystal polymers, and combinations comprising at least one of the foregoing;

baking the second base glitter at a temperature ranging from room temperature to 160° C.;

applying a clear paint to the second base glitter paint, wherein the second base glitter paint is in a hardened state; and baking the clear paint at a temperature ranging from room temperature to 160° C. wherein the resulting metallic tone glitter paint film obtains both a pearlescent gloss and a metallic gloss.

13. The method of claim 12 wherein the mass of solid fraction of the very small scale-like pigment in the glitter paint is from 2 to 50 parts by mass per 100 parts by mass of resin solid fraction.

14. The method of claim 12 wherein at least one of the aluminum pigments (A), (B), (C) and (D) is selected from the group consisting of aluminum flake pigments, colored aluminum flake pigments, metal oxide coated aluminum flake pigments, vapor deposited aluminum flake pigments, and combinations thereof.

15. The method of claim 12 wherein the ratio by mass of aluminum pigment (D) and the very small scale-like pigment in the glitter paint is from 0:100 to 50:50 parts by mass.

16. A painted object which is furnished with a paint film which has been formed with the method of claim 12.

17. The method of claim 7 wherein the very small scale-like pigment is selected from the group consisting of metal oxide coated mica pigments, metal oxide coated synthetic mica pigments, metal oxide coated alumina flake pigments, metal oxide coated silica flake pigments, metal oxide coated iron oxides.

18. The method of claim 17 wherein the metal oxide is selected from the group consisting of $TiO_2$, $Fe_2O_3$, $SnO_2$, $ZrO_2$, and combinations thereof.

* * * * *